US006800113B2

(12) United States Patent
Contrucci et al.

(10) Patent No.: US 6,800,113 B2
(45) Date of Patent: Oct. 5, 2004

(54) EQUIPMENT FOR DISTRIBUTION AND FEEDING OF CHARGE AND FUEL IN SHAFT FURNACES OF RECTANGULAR CROSS SECTION

(75) Inventors: Marcos de Albuquerque Contrucci, Rio de Janairo (BR); Pedro Henrique Carpinetti Costa, Joinville (BR)

(73) Assignee: Startec Iron LLC, Edina, MN (US)

( * ) Notice: Subject to any disclaimer, the term of this patent is extended or adjusted under 35 U.S.C. 154(b) by 0 days.

(21) Appl. No.: 09/892,654

(22) Filed: Jun. 28, 2001

(65) Prior Publication Data

US 2003/0000343 A1 Jan. 2, 2003

(51) Int. Cl.⁷ ........................... C21B 11/02; C22B 1/214
(52) U.S. Cl. .............. 75/473; 75/487; 75/499; 75/500; 266/144; 266/176; 266/197
(58) Field of Search .................. 75/473, 487, 499, 75/500; 266/144, 176, 197

(56) References Cited

U.S. PATENT DOCUMENTS

| 1,945,341 A | | 1/1934 | Brassert |
| 2,942,866 A | * | 6/1960 | Anderson .................. 266/197 |
| 3,257,016 A | | 6/1966 | Idmoni |
| 3,594,154 A | | 7/1971 | Kanokogi |
| 3,799,368 A | * | 3/1974 | Wierczorek .................. 266/176 |
| 3,864,122 A | * | 2/1975 | Seelig et al. ................. 266/197 |
| 4,243,351 A | * | 1/1981 | Legille et al. .............. 414/206 |
| 4,387,562 A | * | 6/1983 | Takao et al. ................. 266/144 |
| 4,461,142 A | * | 7/1984 | Nagata et al. ............. 60/39.02 |
| 4,913,406 A | * | 4/1990 | Fukushima et al. ......... 266/176 |
| 6,391,086 B1 | * | 5/2002 | Contrucci et al. ............ 75/319 |

FOREIGN PATENT DOCUMENTS

| DE | 618 037 | 8/1931 |
| GB | 397744 | 8/1933 |
| GB | 655587 | 7/1951 |
| GB | 1161872 | 8/1969 |
| GB | 1491645 | 11/1977 |
| JP | 59143009 | 8/1984 |
| JP | 60251208 | 12/1985 |
| JP | 01263208 | 10/1989 |

* cited by examiner

Primary Examiner—Melvyn Andrews
(74) Attorney, Agent, or Firm—Ladas & Parry

(57) ABSTRACT

The present invention refers to an equipment for feeding and distributing charge and fuel in furnaces of rectangular cross section, comprising movable feeding tubes to distribute along the longitudinal section and the cross section of the furnace, both a charge comprised of self-reducing agglomerates, ore, scrap or any other metallic material, and solid fuels of any kind.

14 Claims, 4 Drawing Sheets

EQUIPMENT FOR DISTRIBUTION AND FEEDING OF CHARGE AND FUEL IN SHAFT FURNACES OF RECTANGULAR CROSS SECTION

DESCRIPTION OF THE INVENTION

The present invention relates to apparatus for distribution of charges in shaft furnaces of rectangular cross section intended for the production of pig iron, cast iron, or any other alloyed cast metal, from agglomerates, which may or may not be self-reducing, or a metallic charge to provide by means of a controlled distribution of the charge an efficient fluid dynamic pattern.

The conventional equipment and methods used for feeding and distribution of charges in circular cross section shaft furnaces are already known, such as for example those used with blast furnaces, electric reduction furnaces, cupola furnaces, and the like.

In shaft furnaces, the gasses formed by the combustion of the solid or gaseous fuel with the blowing air ascend through the furnace shaft in countercurrent flow to the charge, preheat the same, cool down and leave through an upper portion of the furnace. The refining efficiency of the shaft furnaces of this type is therefore dependent on the contact between these gasses and the charge.

In blast furnaces the charge formed of classified ore, pellets, sintered or other conventional agglomerates, coke and limestone is charged sequentially through the upper part of the furnace to form a continuous column of charge. The charge is distributed uniformly along the furnace cross section depending on the granular size of its constituents to ensure good permeability and distribution of the ascending gasses in counter current flow to the charge. This is achieved by the use of rotating distributors and/or deflectors that are fed with charge material from a single location.

In furnaces having rectangular cross sections, such as for example in self-reduction furnaces, the charge comprised of self-reducing agglomerates is charged through the central upper shaft while the fuel is charged laterally through a shaft which is concentric to the central upper shaft. In order to improve the efficiency of the thermal exchange between the ascending gasses and the charge by minimizing the wall effect it is important to build a central column made of coke located along the longitudinal cross section. Since the length of these furnaces is quite longer than the width thereof, the use of the distributors employed in circular cross section furnaces may not be adequate for these furnaces. A greater number of distributors may be required along the longer side of the furnace cross section.

SUMMARY OF THE INVENTION

In accordance with the invention, apparatus is provided for introducing and distributing a charge including a metal oxide and solid fuel to a shaft furnace having a rectangular interior cross section for the production of molten metal from said metal oxide. Means are provided for feeding the charge to means for conveying the charge to the shaft furnace. Means are provided for distributing the charge from the conveying means to the shaft furnace to form in the interior cross section of the furnace a vertical column of the charge in a selected pattern of said metal oxide and solid fuel to maximize exchange of heat between ascending hot gas within the interior cross section and the vertical column of the charge.

The metal oxide may include self-reducing agglomerates thereof, self fluxing agglomerates or both.

The vertical column of the charge may comprise a longitudinal central portion of solid fuel surrounded by a longitudinal portion of metal oxide.

Particles of the solid fuel may be distributed within the longitudinal portion of the metal oxide to increase the permeability thereof to improve flow of the ascending hot gas through the vertical column of the charge.

The present invention relates to apparatus for feeding and distributing charge and fuels for shaft furnaces of rectangular cross section, resulting in a stacked configuration with a more efficient fluid dynamic pattern in order to maximize the exchange of heat between the ascending hot gasses and the descending charge. This apparatus achieves uniform distribution of charge material and fuel along the longitudinal section and the cross section of the furnace, both in terms of type (fuel or charge) and of granular size (finer or coarser), with the charge material being fed to the furnace from a single location.

Therefore, the present invention provides an apparatus for the distribution and feeding of charge and fuel in shaft furnaces having a rectangular cross section that includes an assembly comprising at least one of a hopper, sealing and proportioning valves and fixed tube to provide for the distribution along the longitudinal section and the cross section of the furnace, both of a charge comprised of self-reducing agglomerates, ore, scrap or any other metallic material, and of fuel.

The distributing means may include at least one movable tube journaled for movement along a single plane and may include at least one movable tube journaled for movement along two planes.

In accordance with the method of the invention, a charge including a metal oxide and a solid fuel is distributed in a shaft furnace having a rectangular interior cross section, with the charge being used for the production of molten metal from the metal oxide of the charge. In accordance with this method, a vertical column of the charge is formed in the interior cross section of the shaft furnace. The metal oxide and the solid fuel is distributed to produce a selected cross sectional pattern therefrom in the vertical column of the charge to maximize exchange of heat between ascending hot gas and the vertical column of the charge. This is continued to maintain this selected cross sectional pattern during the production of the molten metal.

The metal oxide may include self-reducing agglomerates, self-fluxing agglomerates, or agglomerates that are both self-reducing and self-fluxing.

The pattern preferably comprises a central portion of the solid fuel surrounded by an outer portion of the metal oxide.

Preferably, particles of the solid fuel may be distributed within the outer portion of the metal oxide to increase the permeability thereof and thus improve flow of the ascending hot gas through the vertical column of the charge.

DESCRIPTION OF THE EMBODIMENTS

Figure 1:
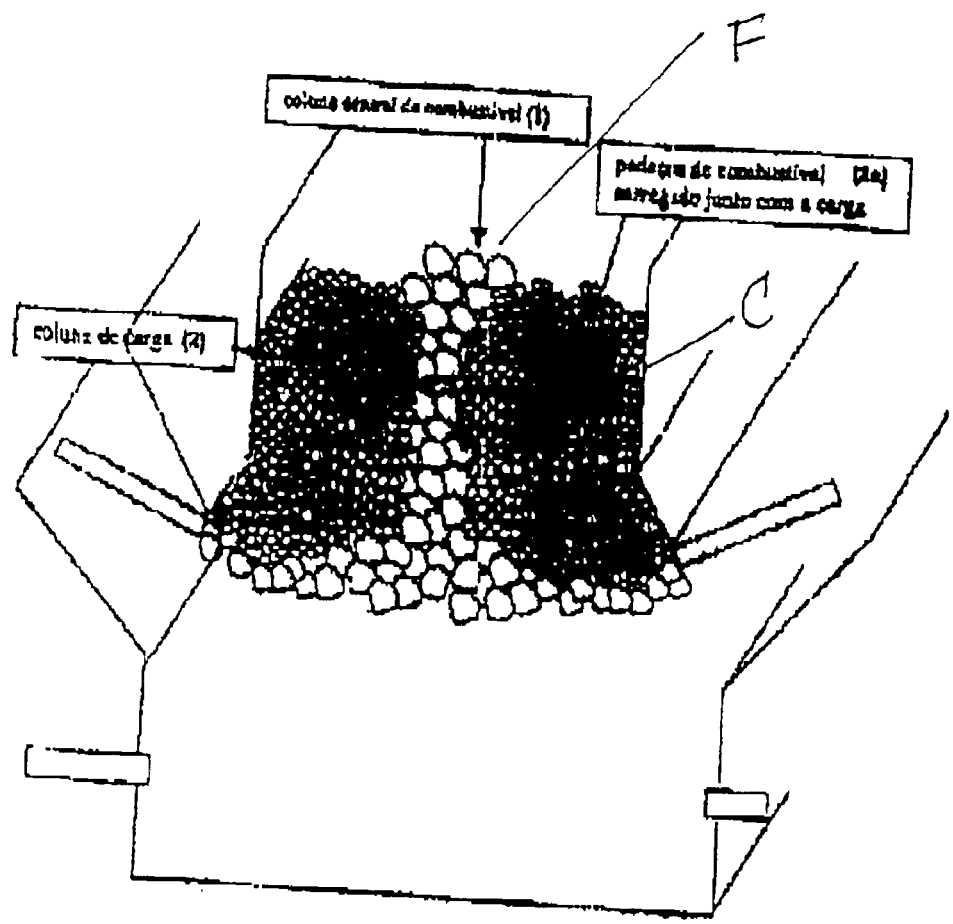
FIG. 1 depicts the configuration of the charge distribution profile that maximizes the exchange of heat between the gasses and the charge.

FIG. 1 is a distribution profile showing the charge C and fuel F in a cross section of a rectangular furnace chamber in accordance with the practice of the invention. A central column of fuel F having a selected width is positioned at a level slightly higher than the column of agglomerates constituting the metal oxide of the charge. Particles of the fuel F may be distributed randomly in the metal oxide to increase the permeability of the charge and thus improve the flow of gas therethrough.

Figure 2:
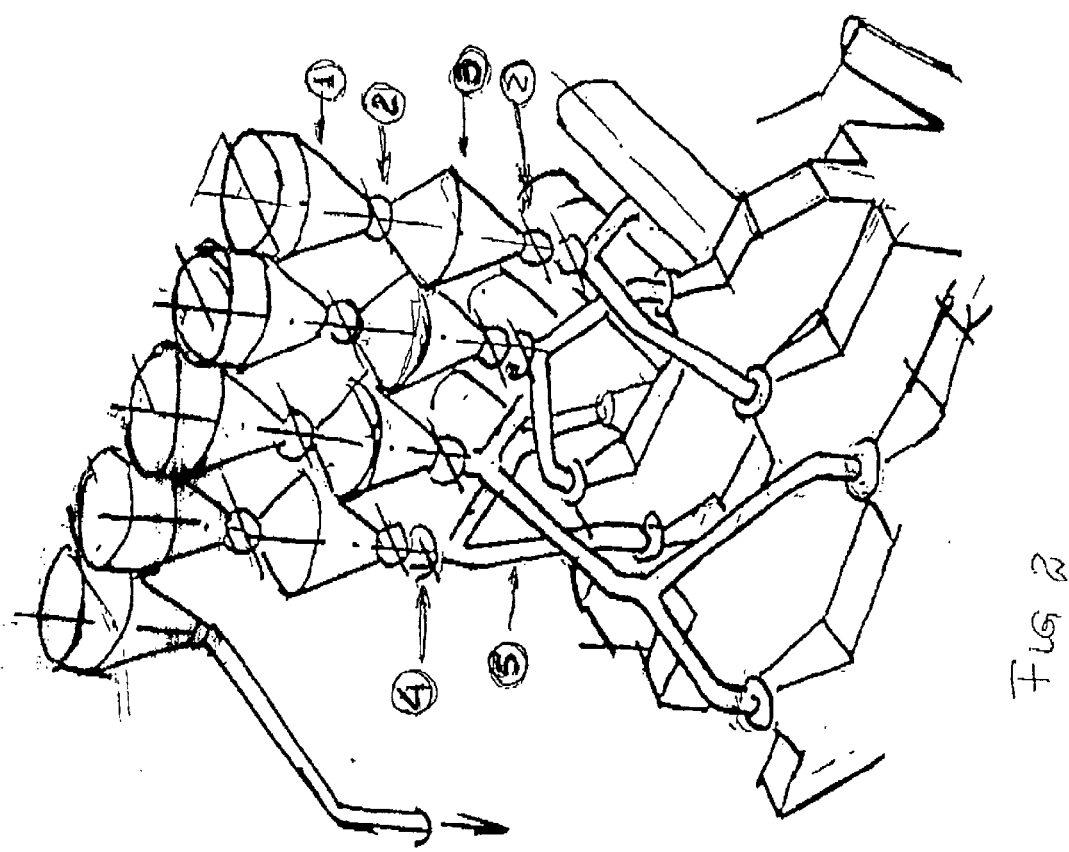
FIG. 2 is a schematic perspective view of the upper part (hoppers, bins, sealing valves and fixed tubes) of the equipment in accordance with the present invention.
Figure 3:
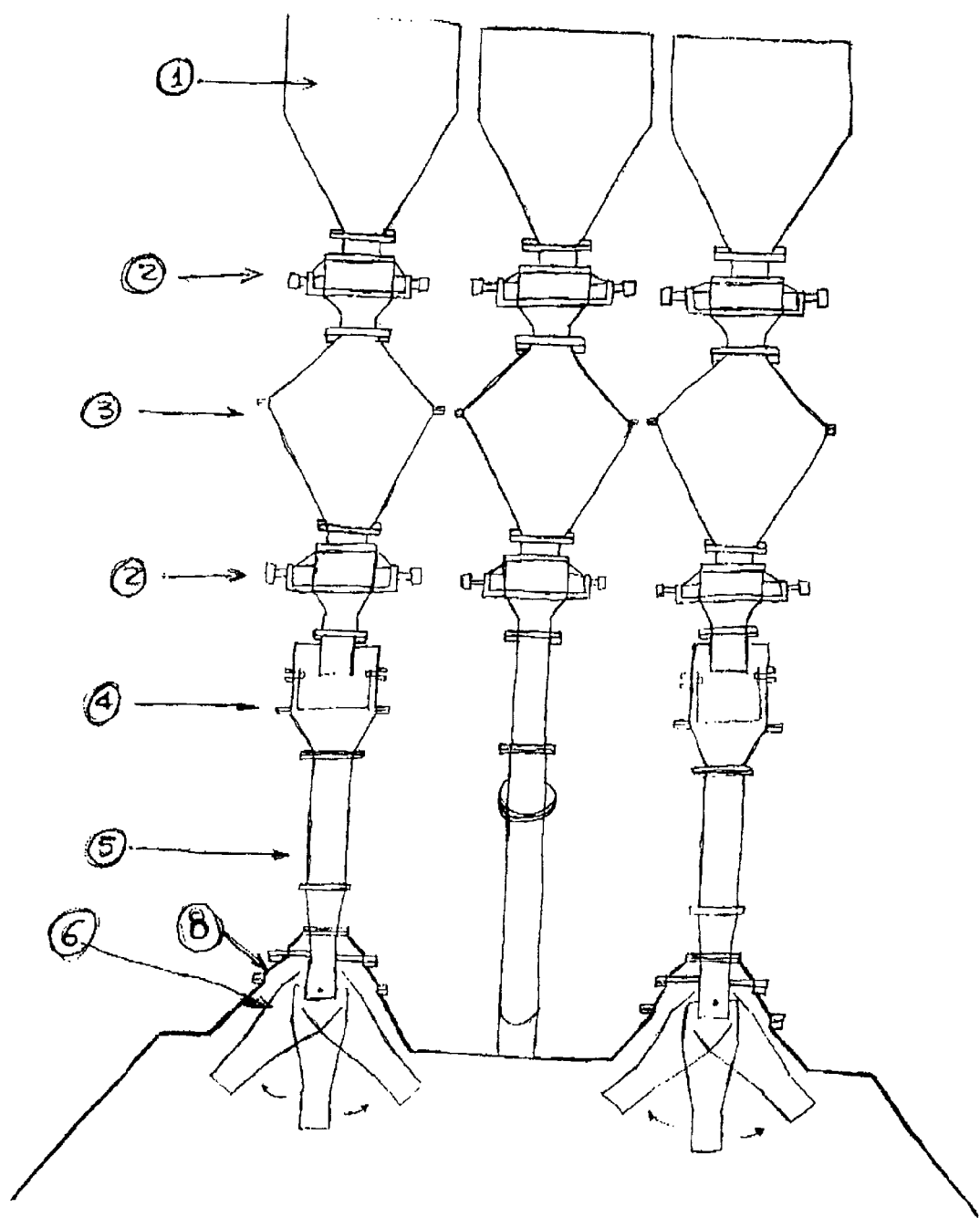
FIG. 3 is a schematic longitudinal sectional view of the equipment, showing the movable tubes for the charge distribution.
Figure 4:
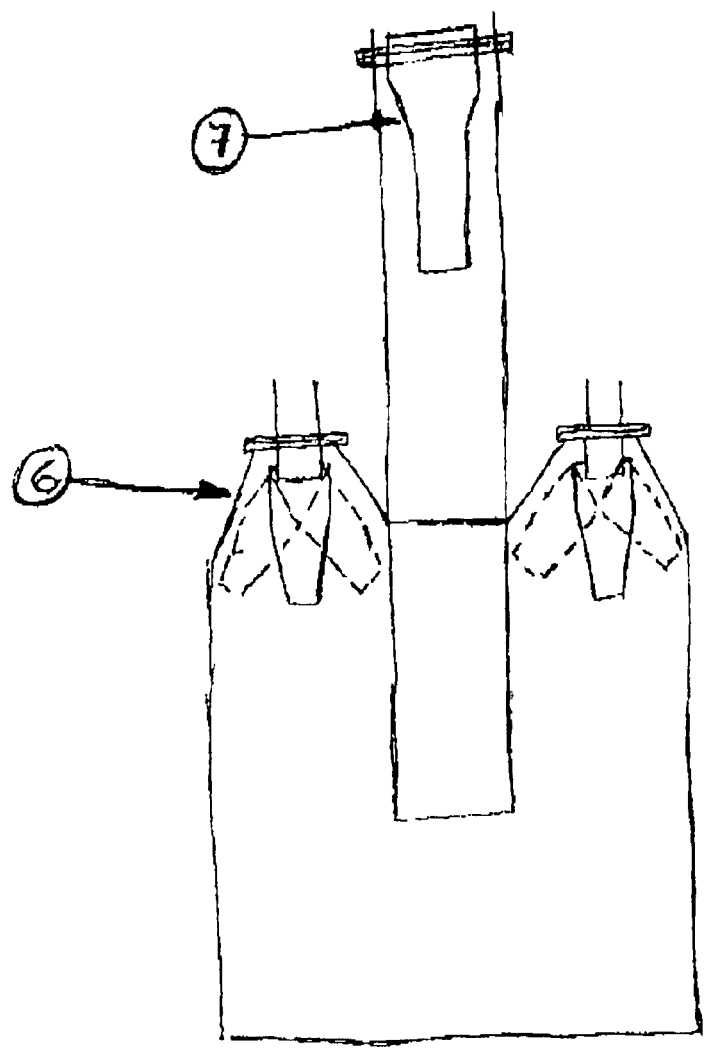
FIG. 4 is a schematic cross sectional view of the equipment of FIG. 3.

As shown in FIGS. 2, 3 and 4, one or more hoppers 1 receive material to be charged and distributed in the furnace. Two seal valves 2 isolate the intermediary bin 3 avoiding gasses passing from the furnace to the atmosphere or air from the atmosphere to the furnace. Below the second seal valve one proportioning valve 4 effects the primary charge distribution between two or more tubes 5. Preferably, this equipment should be installed over the furnace in the centerline thereof.

The primary distributor tubes 5 are fixed over the top 8 of the furnace. One secondary charge distributor movable tube 6 is fixed at the end of each primary distributor tube 5 by gimbals to permit movement in two planes. In a circumstance where movements are to be made in a single plane, the movable tube 6 can be journaled on a single axle, as shown in FIG. 4 and designated as 7. Tubes 6 and 7 are used to distribute the charge along the cross (only tube 6) and longitudinal (tubes 6 and 7) sections of the furnace and thus provide the proper positioning of the solid fuel and metal oxide.

Alternatively, it is possible to provide the secondary charge distributor tube 6 with an axle capable of movement by inclination thereof when only small movement in a cross section is necessary.

The positioning of tubes 6 and 7 are defined by sensors that may be electromagnetic, capacitive, inductive, optic, infrared or any other.

Tubes 6 and 7 may be driven by means of hydraulic pistons or electric motors (not shown).

With this equipment, it is possible to distribute the charge and fuel in positions and levels within the furnace for optimum efficiency.

What is claimed is:

1. An apparatus for introducing and distributing solid fuel and a charge including a metal oxide, to a shaft furnace having a rectangular interior cross-section for the production of molten metal from said metal oxide, said apparatus comprising:
    a fuel distributor for distributing solid fuel into said furnace;
    a charge distributor disposed on opposite sides of said fuel distributor for distributing charge into the furnace;
    said fuel distributor distributing solid fuel into said furnace in a central region thereof to form a longitudinal, central column of solid fuel in said furnace;
    each said charge distributor including a respective tube journaled for movement in two planes perpendicular to one another, one longitudinally of the furnace, the other crosswise to the furnace, for distributing the charge on opposite sides of the solid fuel to form longitudinal columns of said charge on opposite sides of the central column of solid fuel thereby to maximize exchange of heat between ascending hot gas and said charge within said interior cross-section of said shaft furnace.

2. The apparatus as claimed in claim 1 wherein said fuel distributor includes a distributor tube.

3. The apparatus as claimed in claim 2 wherein said distributor tube in said fuel distributor is journaled for movement in one plane longitudinally of said furnace.

4. The apparatus as claimed in claim 1 wherein each said charge distributor extends downwardly in the furnace beyond the fuel distributor.

5. The apparatus as claimed in claim 1 comprising fuel and charge hoppers for respectively supplying fuel to the fuel distributor and charge to the charge distributors.

6. The apparatus as claimed in claim 5 wherein each of said charge distributors is supplied by a respective said charge hopper.

7. The apparatus as claimed in claim 5 wherein both said charge distributors are supplied by a common said charge hopper.

8. The apparatus as claimed in claim 5 wherein one said charge hopper is connected to supply charge to said charge distributors on the opposite sides of said fuel distributor.

9. The apparatus as claimed in claim 3 wherein more than one said fuel distributor are disposed lengthwise along said furnace, and more than one said charge distributor are disposed on each side of the fuel distributors lengthwise of the furnace.

10. The apparatus as claimed in claim 9 comprising Y-shaped charge supplying members connecting the charge distributors on the opposite sides of the fuel distributors.

11. A method for distributing solid fuel and a charge including a metal oxide in a shaft furnace having a rectangular interior cross-section, the charge being used for the production of molten metal from the metal oxide of the charge, said method comprising:
    distributing solid fuel in a central region in said furnace to form a longitudinal central column of solid fuel in said furnace;
    distributing charge on opposite sides of the solid fuel by moving distributing tubes for the charge in two planes perpendicular to one another, one lengthwise of the furnace, the other crosswise of the furnace, on opposite sides of the solid fuel to form longitudinal columns of said charge on opposite sides of the central column of solid fuel thereby to maximize exchange of heat between ascending hot gas and said charge; and
    continuing said distributing of said charge and said solid fuel to maintain said central column of solid fuel and charge column on opposite sides of said central column during said production of said molten metal.

12. The method as claimed in claim 11 comprising distributing the fuel in the central region by moving a fuel distributor tube in one plane longitudinally of the furnace.

13. The method as claimed in claim 11 wherein the distribution of the solid fuel in the central region is carried out so that the central column of the solid fuel has a narrower width than the column of longitudinal charge on both sides of the central column.

14. The method as claimed in claim 11 wherein the distribution of the solid fuel is initially carried out without distribution of charge to produce a layer of fuel all across the width of the furnace.

* * * * *